United States Patent
Iwasaki

[11] Patent Number: 6,097,616
[45] Date of Patent: Aug. 1, 2000

[54] DRIVE-VOLTAGE CONTROL DEVICE HAVING A SWITCHING ELEMENT FOR A DRIVE-VOLTAGE SUPPLY LINE AND AN IMAGE FORMING APPARATUS USING THE DRIVE-VOLTAGE CONTROL DEVICE

[75] Inventor: Kazuya Iwasaki, Saitama, Japan

[73] Assignee: Ricoh Company, Ltd., Tokyo, Japan

[21] Appl. No.: 09/272,773

[22] Filed: Mar. 19, 1999

[30] Foreign Application Priority Data

Mar. 30, 1998 [JP] Japan .................................. 10-083298

[51] Int. Cl.[7] .................................................... H02M 3/24
[52] U.S. Cl. ............................................................ 363/97
[58] Field of Search ................................ 363/15, 16, 40, 363/41, 49, 95, 97, 131

[56] References Cited

U.S. PATENT DOCUMENTS

| | | | |
|---|---|---|---|
| 5,555,167 | 9/1996 | Fujihashi | 363/49 |
| 5,880,942 | 3/1999 | Leu | 363/49 |
| 5,881,299 | 3/1999 | Nomura et al. | 395/750.06 |
| 5,920,466 | 7/1999 | Hirahara | 363/21 |

FOREIGN PATENT DOCUMENTS

8-69225  3/1996  Japan .

*Primary Examiner*—Matthew Nguyen
*Attorney, Agent, or Firm*—Oblon, Spivak, McClelland, Maier & Neustadt, P.C.

[57] ABSTRACT

A drive-voltage control device for a power-saving power-supply circuit provides a control voltage and a drive voltage to a load device connected thereto and controls the supply of the control voltage and the drive voltage so as to achieve a power-saving mode. The drive-voltage control device prevents the load device from being damaged due to on and off of the power-saving mode. The load device is driven by both the control voltage and the drive voltage. A switching element is provided to a power-supply line through which the drive voltage is supplied from the power-saving power-supply circuit to the load device. A timing control circuit controls a timing for switching the switching element so that the switching element is caused to be conductive when a predetermined period has passed after the supply of the control voltage to the load device is begun when the power-saving mode is turned off. The switching element is caused to be nonconductive when the control voltage falls to a predetermined level when the power-saving mode is turned on.

10 Claims, 6 Drawing Sheets

FIG.6

DRIVE-VOLTAGE CONTROL DEVICE HAVING A SWITCHING ELEMENT FOR A DRIVE-VOLTAGE SUPPLY LINE AND AN IMAGE FORMING APPARATUS USING THE DRIVE-VOLTAGE CONTROL DEVICE

BACKGROUND OF THE INVENTION

1. Field of the Invention

The present invention generally relates to a drive-voltage control device and, more particularly, to a drive-voltage control device that controls a drive voltage supplied to an apparatus having a power-saving power-supply circuit. The present invention also relates to an image forming apparatus having the drive-voltage control device.

Recently, many image forming apparatuses such as a copy machine, a printer or a facsimile apparatus are provided with a power-saving power-supply circuit that outputs a plurality of power-supply voltages. The power-saving power-supply circuit outputs a control voltage and a drive voltage when a power-saving mode is turned off, and outputs a waiting voltage instead of the control voltage and the drive voltage when the power-saving mode is turned on.

A liquid crystal display device provided in such an image forming apparatus is one of the devices to which a plurality of power supply voltages are supplied. The liquid crystal display device generates a timing signal in accordance with the control voltage supplied by the power-saving circuit. The liquid crystal display device provides the drive voltage supplied by the power-saving power-supply circuit or a voltage generated based on the drive voltage to electrodes of the liquid crystal display device in accordance with data corresponding to an image to be displayed on a liquid crystal display.

2. Description of the Related Art

In recent years, an international rule has been suggested which rule is related to a power-saving function of image forming apparatuses when they are set in a waiting state. According to such a power saving function, an unnecessary power-supply voltage is cut off in the power-saving mode. Conventionally, the power-saving mode is achieved, on one hand, by continuously providing a waiting voltage to a monitoring unit such as a CPU and a memory unit, and, on the other hand, by interrupting a drive voltage provided to a circuit consuming a large power such as a motor driver, a solenoid driver or an image developing circuit during a waiting time and providing the drive voltage when an instruction is provided to do so. Japanese Laid-Open Patent Application No.8-69225 discloses an image forming apparatus which supplies a reduced voltage to a liquid crystal display device and displays a minimum image on the liquid crystal display device during a waiting time.

In any case, a power-saving power-supply circuit outputting a plurality of power-supply voltages is used which power-saving power-supply circuit outputs both the control voltage and the drive voltage when the power-saving mode is turned off and outputs the waiting voltage instead of the control voltage and the drive voltage when the power-saving mode is turned on.

Figure 1:
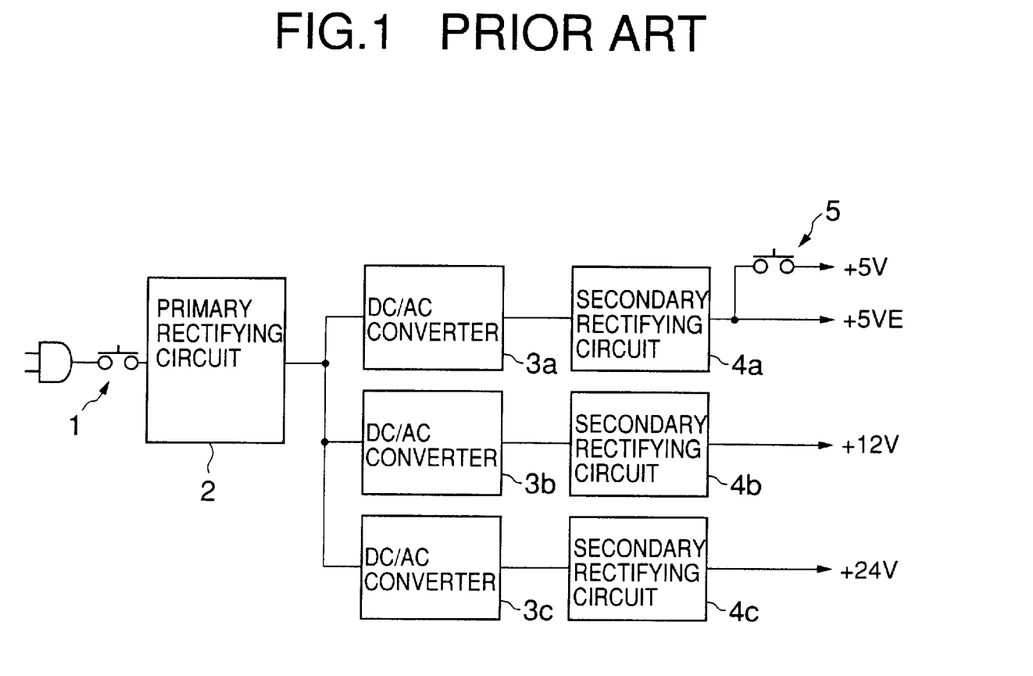
FIG. 1 is a block diagram of a conventional power-saving power-supply circuit.

FIG. 1 is a block diagram of a conventional power-saving power-supply circuit. When a power switch 1 is turned on, an AC voltage provided through a plug is supplied to a primary rectifying circuit 2. The AC voltage is rectified into a DC voltage by the primary rectifying circuit 2. The DC voltage output from the rectifying circuit 2 is provided to three DC/AC converters 3a, 3b and 3c. Each of the DC/AC converters 3a, 3b and 3c converts the DC voltage into an AC voltage so as to decrease the AC voltage. The decreased AC voltage output from each of the DC/AC converters 3a, 3b and 3c is provided to a respective one of secondary rectifying circuits 4a, 4b and 4c so that different direct current (DC) power supply voltages are output from the secondary rectifying circuits 4a, 4b and 4c. In FIG. 1, +5 V is output from the secondary rectifying circuit 4a; +12 V is output from the secondary rectifying circuit 4b; and +24 V is output from the secondary rectifying circuit 4c. A supply line of the +5 V is branched into two lines, and a switch 5 is provided to one of the branched lines. The +5 V on the other one of the two branched lines corresponds to a waiting voltage provided to circuits which must be continuously operated even when the power-saving mode is turned on. This voltage is referred to as +5VE as shown in FIG. 1.

When a power-saving mode is turned on, the DC/AC converters 3b and 3c are turned off in accordance with a signal sent from a control unit of an image forming apparatus (not shown in the figure). Additionally, when the power-saving mode is turned on, the +5V is interrupted by turning off the switch 5. Accordingly, when the power-saving mode is turned on, the +5 V, the +12 V and the +24 V are interrupted and only the +5 VE is output from the power-saving power-supply circuit.

Figure 2:
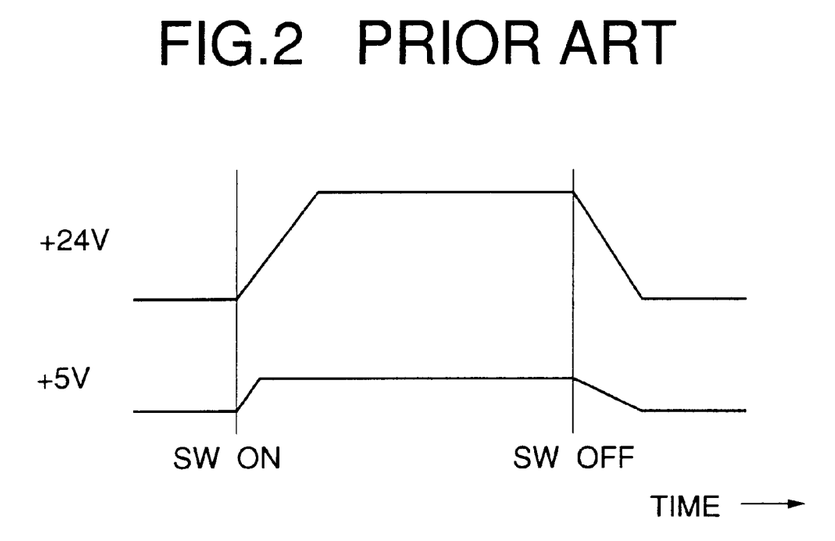
FIG. 2 is a time chart of voltages output from the power-saving power-supply circuit shown in FIG. 1 when a power switch of the power-saving power-supply circuit is turned on and off.

FIG. 2 shows a time chart of the DC voltages output from the power-saving power-supply circuit shown in FIG. 1 when the power switch 1 is turned on and off. In FIG. 2, voltages at the +5 V line and the +24 V line are indicated. As shown in FIG. 2, each of the voltages at the +5 V line and +24 V line is gradually increased after the power switch 1 is turned on, and is gradually decreased after the power switch 1 is turned off. There is not a large difference between a time for the voltage at the +24V line to become a constant voltage and a time for the voltage at the +5 V line to become a constant voltage. The time needed for each of the voltages at the +5 V line and the +24 V line to become a constant voltage is dependent on an operation of the DC/AC converters 3a and 3c and a state of a load connected to the +5 V line and the +24 V line.

Figure 3:
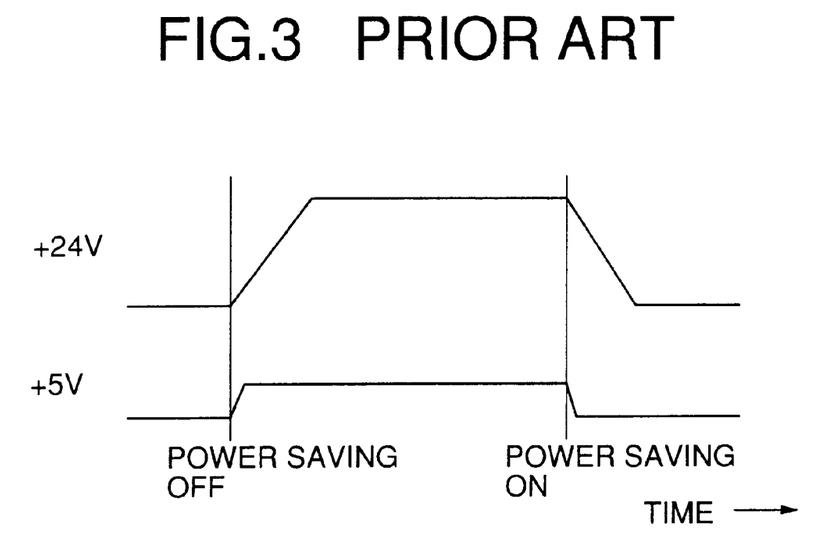

FIG. 3 shows a time chart of the voltages at the +5 V line and the +24 V line when the power-saving mode is turned off, and, thereafter, turned on. When the power-saving mode is turned off and on, the voltage at the +24 V line is interrupted in the same manner as when the power switch 1 is turned on and off. On the other hand, the voltage on the +5 V line is controlled by turning on and off the switch 5. Accordingly, a rate of increase and decrease in the voltage at the +5 V line is much larger than that of the voltage at the +24 V line. Particularly, a rate of decrease in the voltage at the +5 V line is much larger than that of the voltage at the +24 V line.

The control voltage +5 V is mainly used for control circuits. Some parts in the image forming apparatus to which the power-saving power-supply circuit shown in FIG. 1 is connected, are supplied with the control voltage +5 V for a controlling circuit and the drive voltage +24 V for a driver circuit. In these parts, if the voltage for the controlling circuit is interrupted before the drive voltage is interrupted, the parts or the driver circuit in the parts may be damaged. A liquid crystal display device provided in an operational panel of the image forming apparatus is one of the parts which may be damaged when the control voltage is interrupted before the drive voltage is interrupted. If the liquid crystal display device is damaged, a user is negatively influenced. Thus, such a problem must be eliminated.

SUMMARY OF THE INVENTION

It is a general object of the present invention to provide an improved and useful drive-voltage control device for a power-saving power-supply circuit in which the above-mentioned problem is eliminated.

A more specific object of the present invention is to provide a drive-voltage control device for a power-saving power-supply circuit providing a control voltage and a drive voltage to a load device connected thereto and controlling the control voltage and the drive voltage so as to achieve a power-saving mode, which drive-voltage control device can prevent the load device from being damaged due to the power-saving mode being turned on and off.

In order to achieve the above-mentioned object, there is provided according to one aspect of the present invention a drive-voltage control device adapted to be connected between a power-saving power-supply circuit and a load device, the power-saving power-supply circuit outputting a control voltage and a drive voltage when a power-saving mode is turned off, the power-saving power-supply circuit outputting a waiting voltage while interrupting the control voltage and the drive voltage when the power-saving mode is turned on, the load device being driven by both the control voltage and the drive voltage, the drive-voltage control device comprising:

a switching element provided to a power supply line through which the drive voltage is supplied from the power-saving power-supply circuit to the load device; and a timing control circuit controlling a timing for switching the switching element so that the switching element is caused to be conductive when a predetermined period has passed after the supply of the control voltage to the load device is begun when the power-saving mode is turned off, and the switching element is caused to be nonconductive when the control voltage falls to a predetermined level when the power-saving mode is turned on.

According to the above-mentioned invention, the supply of the drive voltage to the load device is delayed by the predetermined period after the supply of the control voltage to the load device. Accordingly, when the power-saving mode is turned off, the drive voltage is supplied in a condition in which the load device is prepared for operation. Additionally, when the power-saving mode is turned on, the drive voltage is rapidly interrupted by the switching element. That is, the drive voltage is not maintained when the supply of the control voltage to the load device is stopped. Thus, the load device is prevented from being damaged due to the drive voltage being supplied to the load device which is not prepared for operation.

In the drive-voltage control device according to the present invention, the timing control circuit may include a delay circuit delaying a time for turning on the switching element by the predetermined period when the power-saving mode is turned off, the predetermined period being determined in accordance with a timing signal supplied to the load device.

According to this invention, the predetermined period for the delay in timing of turning on the switching element is determined by the timing signal supplied to the load device. Accordingly, an appropriate time delay can be determined in relation to operation of the load device so that the drive voltage is supplied to the load device after the load device is positively prepared for operation.

In one embodiment according to the present invention, the switching element may comprise a field effect transistor. Since the field-effect transistor has a small ON resistance, a voltage drop in the switching element is reduced. Thus a normal operation of the load device is maintained without being influenced by the voltage drop in the switching element.

It is preferable that the field-effect transistor has a resistance of smaller than 10Ω when the field-effect transistor is in a conductive state.

Additionally, in the drive-voltage control device according to the present invention, the predetermined level of the control voltage may be set to be about 90% of the control voltage.

The above-mentioned drive-voltage control device may be provided to an image forming apparatus operable in a power-saving mode in which an electric power provided to a part of circuits provided in the image forming apparatus is interrupted to reduce power consumption.

Other objects, features and advantages of the present invention will become more apparent from the following detailed description when read in conjunction with the accompanying drawings.

BRIEF DESCRIPTION OF THE DRAWINGS

FIG. 3 is a time chart of the voltages output from the power-saving power-supply circuit shown in FIG. 1 when a power-saving mode is turned off and on;

DETAILED DESCRIPTION OF THE PREFERRED EMBODIMENT

Before explaining an embodiment of the present invention, a description will be given of a copy machine to which a drive-voltage control device according to the present invention is applied.

Figure 4:
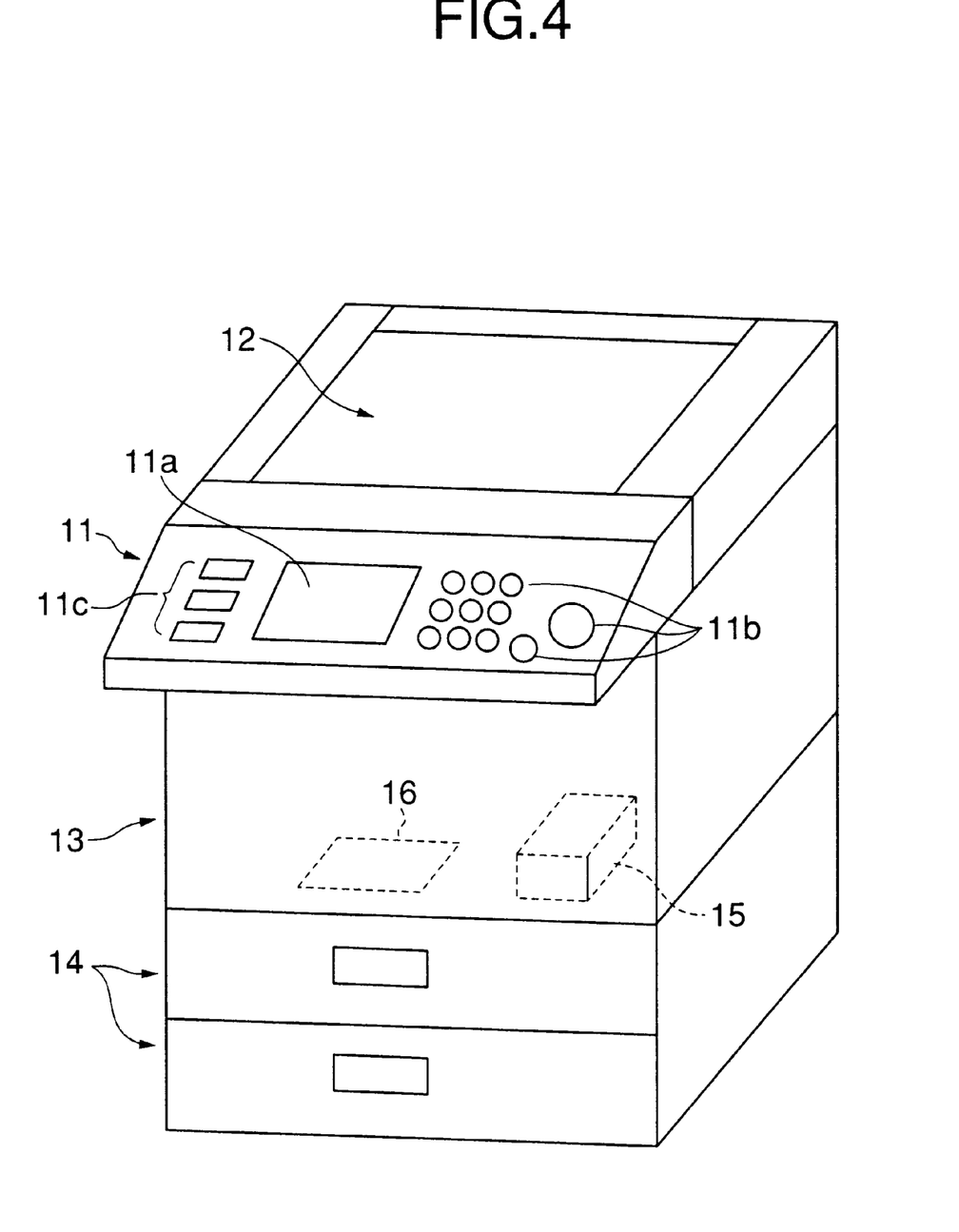
FIG. 4 is an illustration of a copy machine provided with a drive-voltage control device according to the present invention.

FIG. 4 is an illustration of the copy machine 10 provided with a drive-voltage control device according to the present invention. The copy machine 10 comprises an operational panel 11, an original document reading unit 12, a main body 13 and a paper supply tray 14. The operational panel 11 includes a liquid crystal display (LCD) 11a for displaying a state of the copy machine 10, a plurality of keys 11b such as a start key and numeric keys and a plurality of light-emitting diodes (LEDs). The original document reading unit 12 includes a contact glass on which an original document to be read is placed. The main body 13 accommodates a copy engine (not shown in the figure) that performs a copying operation with a print paper supplied from the paper supply tray 14. The main body 13 also accommodates a power-supply unit 15 which supplies an electric power to each part of the copy machine 10 and a control board 16 which controls operations of each part of the copy machine 10.

Figure 5:
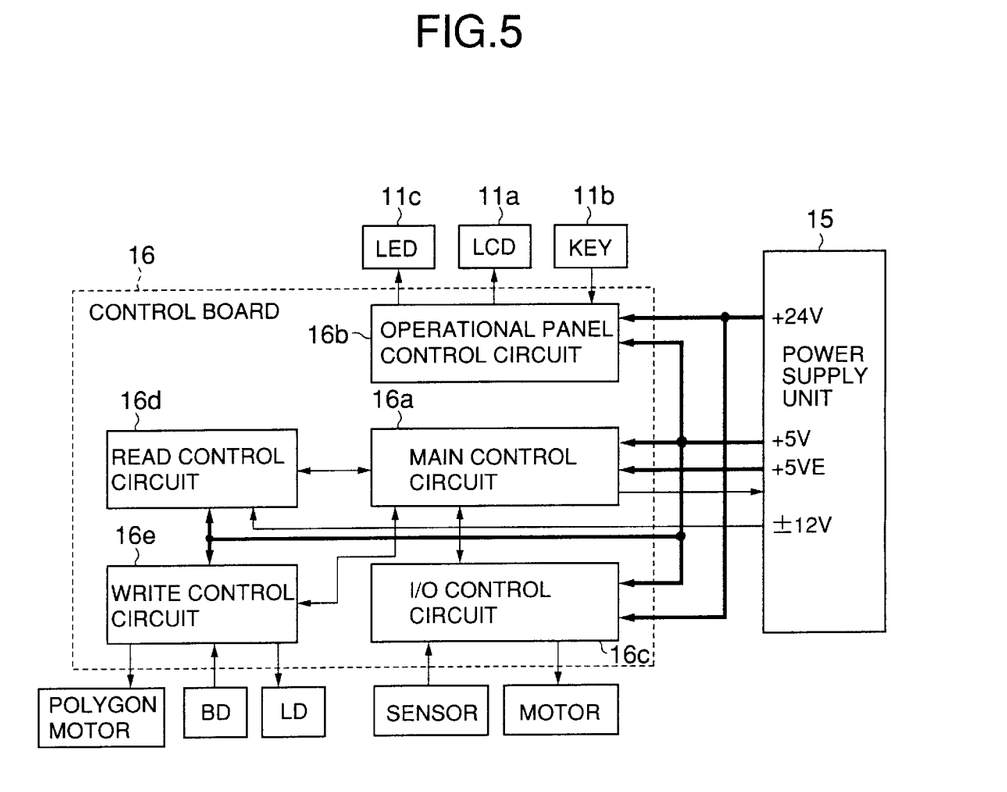
FIG. 5 is a block diagram of a control board connected to a power-supply unit shown in FIG. 4.

FIG. 5 is a block diagram of the control board 16 connected to the power-supply unit 15.

The control board 16 includes a main control circuit 16a, an operational panel control circuit 16b, an I/O control circuit 16c, a read control circuit 16d and a write control circuit 16e. The main control circuit 16a controls the operational panel control circuit 16b, the I/O control circuit 16c, the read control circuit 16d and the write control circuit 16e. The operational panel control circuit 16b controls operations of the LCD 11a, the keys 11b and the LEDs 11c of the operational panel 11 in accordance with a control signal provided by the main control circuit and an electric power provided by the power-supply unit 15. The I/O control circuit 16c controls various sensors and motors provided in the copy machine 10. The read control circuit 16d controls a reading operation of a scanner (not shown in the figure) and an operation for converting read data into image data. The write control circuit 16e controls a laser diode (LD) for forming a latent image on a photosensitive drum (not shown in the figure) and a polygon motor for rotating a polygon mirror (not shown in the figure).

Necessary voltages are supplied from the power-supply unit 15 to each of the control circuits 16a, 16b, 16c, 16d and 16e. The voltages supplied to the control circuits include +5 V for CPUs and logic circuits, +24 V for various motors and the LCD 11a and ±12 V for analog operational amplifiers.

Additionally, +5 VE is provided from the power supply unit 15 to the main control circuit 16a of the control board 16. The +5 VE is continuously provided from the power supply unit 15 to the main control circuit 16a even when the copy machine 10 is set in a power-saving mode and other voltages +5V, ±12V and +24V are interrupted, so that the copy machine 10 can return to a regular operation mode when an instruction signal is provided from an external apparatus. That is, a part of the main control circuit 16a is continuously operated so as to return the copy machine to the regular operation mode by the instruction signal provided from the external apparatus such as a host computer or a facsimile machine connected to the copy machine 10. It should be noted that the voltages other than the +5 VE are interrupted by a switch (corresponding to the switch 5 shown in FIG. 1) provided to an output line of the power-supply unit 15 or deactivation of a DC/AC converter (corresponding to the DC/AC converters 3b and 3c shown in FIG. 1) provided in the power supply unit 15.

Figure 6:
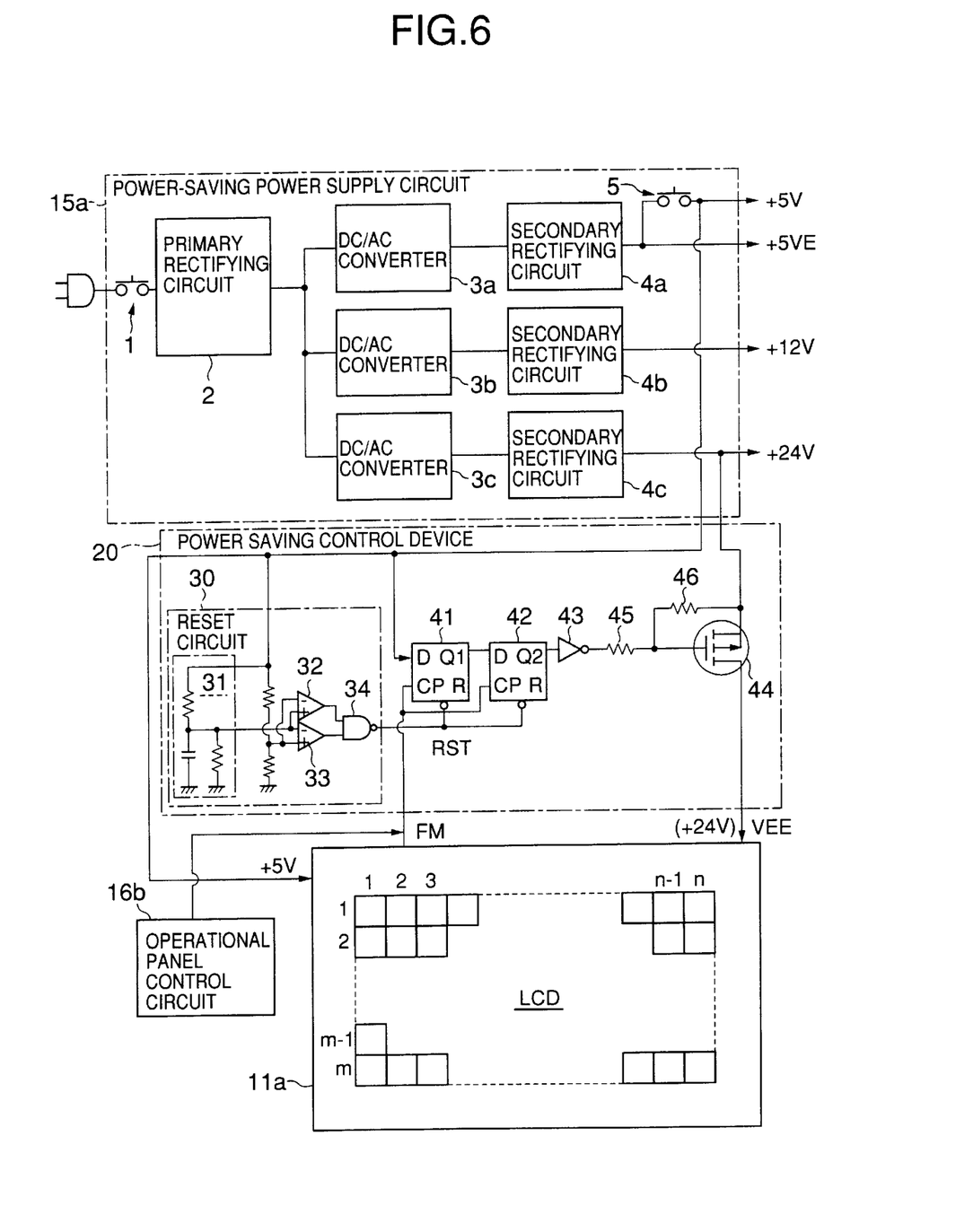
FIG. 6 is a circuit diagram of the drive-voltage control device connected to a power-saving power-supply circuit provided in the power supply unit shown in FIG. 5.

A description will now be given, with reference to FIG. 6, of a drive-voltage control device 20 according to an embodiment of the present invention. FIG. 6 is a circuit diagram of the drive-voltage control device 20 connected to a power-saving power-supply circuit 15a provided in the power supply unit 15 shown in FIG. 5. The power-saving power-supply circuit 15a has the same structure as the power-saving power-supply circuit shown in FIG. 1. Thus, in FIG. 6, parts of the power-saving power-supply circuit 15a that are the same as the parts shown in FIG. 1 are given the same reference numerals, and descriptions thereof will be omitted.

The drive-voltage control device 20 is provided between the power-saving power-supply circuit 15a and the LCD 11a of the operational panel 11. The control voltage +5 V is directly supplied to a control circuit (not shown) of the LCD 11a, and the drive voltage +24 V is supplied to electrodes of the LCD 11a via a field-effect transistor (FET) 44 of the drive-voltage control device 20.

Figures 7A, 7B:
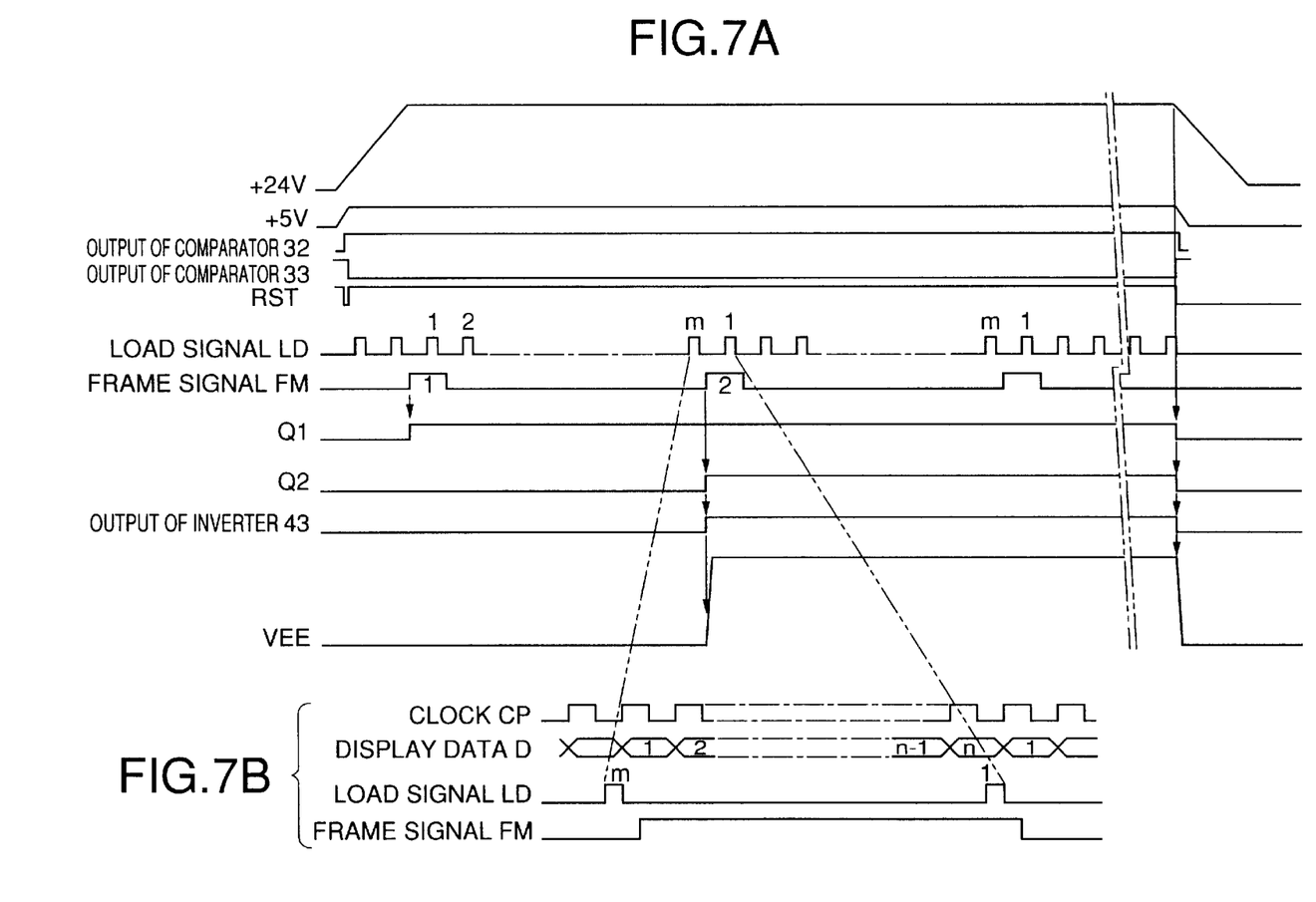
FIG. 7A is a time chart for explaining operations of parts provided in the drive-voltage control device shown in FIG. 6.
FIG. 7B is a time chart of signals and data in an LCD shown in FIG. 6.

FIG. 7A shows a time chart for explaining operations of parts provided in the drive-voltage control device 20 in relation to the control voltage +5 V and the drive voltage +24 V. FIG. 7B shows a time chart of signals and data in the LCD 11a when the control voltage +5 V is provided.

In FIGS. 7A and 7B, D represents display data; CP represents a clock for latching and shifting the display data; LD represents a load signal on each line basis; and FM represents a frame signal. The display data D is input to a serial n-bit shift register of a control circuit (LSI circuit; not shown in the figure) provided in the LCD 11a in synchronization with the clock CP. When the shift register receives the display data corresponding to n bits, the shift register generates an LD pulse and outputs the display data D stored in the shift register in parallel. That is, the shift register outputs the display data D corresponding to a single line of the LCD 11a. At this time, when the frame signal FM is a high level "H", the first line is selected at a falling edge of the load signal LD so that n-dot data is displayed on the first line. Other lines which are not selected are not displayed. Thereafter, the display data D corresponding to the second line is latched by the shift register, and the second line is displayed when the frame signal FM is a low level "L" at a falling edge of the load signal LD. Thereafter, the same operation is repeated until the m-th line is displayed, and the display operation corresponding to a single frame is completed.

Referring to FIG. 6, in the drive-voltage control device 20, the control voltage +5 V is supplied to a D-flip-flop 41. An output Q1 of the D flip-flop 41 is supplied to a D flip-flop 42. An output Q2 of the D flip-flop 42 is supplied to an inverter 43. The FET 44 is controlled by an output of the inverter 43. That is, the FET 44 is turned on (conductive state) when the output Q2 of the D flip-flop 42 is a high level "H", that is, when the output of the inverter 43 is a low level "L". On the other hand, the FET 44 is turned off (nonconductive state) when the output Q2 of the D flip-flop 42 is a low level "L", that is, when the output of the inverter 43 is a high level "H". It should be noted that resistors 45 and 46 are bias bleeder resistors for the FET 44.

The frame signal is supplied from the operational panel control circuit 16b to each of the D flip-flops 41 and 42. Additionally, a reset signal RST is supplied from a reset circuit 30 to a reset terminal R of each of the D flip-flops 41 and 42. Each of the the D flip-flops 41 and 42 is reset when the reset signal RST is changed to "L", and each of the outputs Q1 and Q2 becomes "L". Thus, the FET 44 is turned off.

The reset circuit 30 is constructed by providing an additional circuit, which generates the reset signal RST when power is turned off, to a so-called power-on reset circuit which generates the reset signal RST when power is turned on. In this embodiment, the reset circuit 30 comprises a time constant circuit 31, comparators 32 and 33 and a NAND gate 34. The time constant circuit 31 generates a voltage that rises a predetermined time after rising of the control voltage +5 V and falls a predetermined time after falling of the control voltage +5 V. An output of the comparator 32 is "H" when the voltage generated by the time constant circuit 31 is equal to or greater than about 50% of the control voltage +5 V. The output of the comparator 32 is "L" when the voltage generated by the time constant circuit 31 is smaller than about 50% of the control voltage +5 V. On the other hand, an output of the comparator 33 is "L" when the voltage generated by the time constant circuit 31 is equal to or greater than about 90% of the control voltage +5 V. The output of the comparator 33 is "H" when the voltage generated by the time constant circuit 31 is smaller than about 90% of the control voltage +5 V. Thereby, an output of the NAND gate 34, that is, the reset signal RST output from the reset circuit 30, becomes the reset level "L" when a supply of the control voltage +5 V, which is supplied by the power-saving power-supply circuit 15a, is started and the voltage generated by the time constant circuit 31 is raised to a level about 50% of the control voltage +5 V as shown in FIG. 7A. Additionally, the reset signal RST output from the reset circuit 30 becomes "H" when the voltage generated by the time constant circuit 31 is increased to a level about 90% of the control voltage +5 V. Further, the reset signal RST output from the reset circuit 30 becomes the reset level "L" when the supply of the control voltage +5 V is stopped and the voltage generated by the time constant circuit 31 is decreased to a level about 90% of the control voltage +5 V.

A description will now be given of an operation of the drive-voltage control circuit 20. In a reset state, each of the outputs Q1 and Q2 of the D flip-flops 41 and 42 is "L". Accordingly, the output of the inverter 43, which is an open collector type inverter and inverts the output Q2 of the D flip-flop 42, is "H". As a result, the FET 44 is turned off and the drive voltage (VEE: +24 V) is not supplied to the LCD 11a. When the reset state is canceled and the first pulse of the frame signal FM is output from the operational panel control circuit 16b, the output Q1 of the D flip-flop 41 is changed to "H". Thereafter, when the second pulse of the frame signal FM is output, the D flip-flop 42 latches the output Q1 and the output Q2 of the D flip-flop 42 is changed to "H". Thereby, the output of the inverter 43 is changed to "L" and the FET 44 is turned on. Thus, the drive voltage VEE≈+24 V is supplied from the FET 44 to the LCD 11a.

A description will now be given of an operation performed when the control voltage +5 V is interrupted. When the control voltage +5 V is interrupted in a state in which the FET 44 is turned on and the drive voltage VEE is output from the drive-voltage control device 20, the reset signal RST is changed to "L" when the control voltage +5 V is decreased to a slightly smaller value (about 90%). When the reset signal RST is changed to "L", each of the D flip-flops 41 and 42 is reset, and each of the outputs Q1 and Q2 is changed to "L". Thereby, the output of the inverter 43 is changed to "H", and the FET 44 is turned off. As a result the drive voltage VEE being supplied to the LCD 11a is interrupted. Accordingly, the drive voltage VEE is rapidly interrupted at a time when a major part of the control voltage +5 V still remains.

As mentioned above, in the drive-voltage control device according to the present embodiment, supply of the drive voltage VEE≈+24 V to the LCD 11a is not started before the control voltage +5 V is supplied to the LCD 11a. Additionally, supply of the drive voltage VEE≈+24 V to the LCD 11a is not continued after the supply of the control voltage +5 V is stopped. Thus, the LCD 11a is prevented from being damaged due to supply of the drive voltage VEE without the control voltage.

It should be noted that although the frame signal FM is used as a timing signal in the present embodiment, the same advantages may be obtained if the clock signal CP or the load signal LD is used depending on an associated LCD.

In the present embodiment, the field effect transistor (FET) 44 is used for switching the drive voltage VEE to the LCD 11a so as to eliminate a problem caused by a voltage drop in the switching element. That is, if the voltage drop in the switching element for the drive voltage is large, a sufficient voltage cannot be supplied to the LCD 11a which results in deterioration of display quality. It is preferable to use a field-effect transistor having an ON resistance of smaller than 10Ω if a voltage drop in the field-effect transistor is a problem. If the ON resistance is smaller than 10Ω, the voltage drop can be reduced to less than 0.1 V since a current flowing to the LCD is several milliamperes. This voltage drop does not influence the display quality.

Additionally, although the LCD is used as a load connected to the drive-voltage control device in the present embodiment, the load is not limited to the LCD and the drive-voltage control device according to the present invention may be used with other parts or devices requiring both the control voltage and the drive voltage.

The present invention is not limited to the specifically disclosed embodiments, and variations and modifications may be made without departing from the scope of the present invention.

The present application is based on Japanese priority application No.10-83298 filed on Mar. 30, 1998, the entire contents of which are hereby incorporated by reference.

What is claimed is:

1. A drive-voltage control device adapted to be connected between a power-saving power-supply circuit and a load device, said power-saving power-supply circuit outputting a control voltage and a drive voltage when a power-saving mode is turned off, said power-saving power-supply circuit outputting a waiting voltage while interrupting the control voltage and the drive voltage when the power-saving mode is turned on, said load device being driven by both the control voltage and the drive voltage, said drive-voltage control device comprising:

a switching element provided to a power supply line through which the drive voltage is supplied from said power-saving power-supply circuit to said load device; and a timing control circuit controlling a timing for switching said switching element so that said switching element is caused to be conductive when a predetermined period has passed after the supply of the control voltage to said load device is begun when the power-saving mode is turned off, and said switching element is caused to be nonconductive when the control voltage falls to a predetermined level when the power-saving mode is turned on.

2. The drive-voltage control device as claimed in claim 1, wherein said timing control circuit includes a delay circuit delaying a time for turning on said switching element by said predetermined period when the power-saving mode is turned off, said predetermined period being determined in accordance with a timing signal supplied to said load device.

3. The drive-voltage control device as claimed in claim 1, wherein said switching element comprises a field-effect transistor.

4. The drive-voltage control device as claimed in claim 3, wherein said field effect transistor has a resistance of smaller than 10Ω when said field-effect transistor is in a conductive state.

5. The drive-voltage control device as claimed in claim 1, wherein said predetermined level of the control voltage is set to be about 90% of the control voltage.

6. An image forming apparatus operable in a power-saving mode in which an electric power provided to a part of circuits provided in said image forming apparatus is interrupted to reduce power consumption, said image forming apparatus comprising:

a power-saving power-supply circuit outputting a control voltage and a drive voltage when the power-saving mode is turned off, said power-saving power-supply circuit outputting a waiting voltage while interrupting the control voltage and the drive voltage when the power-saving mode is turned on;

a load device driven by both the control voltage and the drive voltage; and a drive-voltage control device comprising:

a switching element provided to a power-supply line through which the drive voltage is supplied from said power-saving power-supply circuit to said load device; and a timing control circuit controlling a timing for switching said switching element so that said switching element is caused to be conductive when a predetermined period is passed after the supply of the control voltage to said load device is begun when the power-saving mode is turned off, and said switching element is caused to be nonconductive when the control voltage falls to a predetermined level when the power-saving mode is turned on.

7. The image forming apparatus as claimed in claim 6, wherein said timing control circuit includes a delay circuit delaying a time for turning on said switching element by said predetermined period when the power-saving mode is turned off, said predetermined period being determined in accordance with a timing signal supplied to said load device.

8. The image forming apparatus as claimed in claim 6, wherein said switching element comprises a field-effect transistor.

9. The image forming apparatus as claimed in claim 8, wherein said field-effect transistor has a resistance of smaller than 10Ω when said field-effect transistor is in a conductive state.

10. The image forming apparatus as claimed in claim 6, wherein said predetermined level of the control voltage is set to be about 90% of the control voltage.

* * * * *